United States Patent [19]
Wheeler

[11] Patent Number: 5,182,848
[45] Date of Patent: Feb. 2, 1993

[54] METHOD FOR ASSEMBLING A STATOR SUBASSEMBLY

[75] Inventor: Dale K. Wheeler, Fallston, Md.

[73] Assignee: Black & Decker Inc., Newark, Del.

[21] Appl. No.: 794,557

[22] Filed: Nov. 19, 1991

Related U.S. Application Data

[62] Division of Ser. No. 443,671, Nov. 28, 1989, Pat. No. 5,099,164, which is a division of Ser. No. 77,263, Jul. 24, 1987, Pat. No. 4,885,496.

[51] Int. Cl.⁵ ............................................. H02K 15/06
[52] U.S. Cl. .................... 29/596; 242/1.1 E; 242/7.03; 310/71; 310/90; 310/91
[58] Field of Search .............. 29/596, 598; 242/1.1 R, 242/1.1 E, 7.03; 310/42, 43, 71, 91, 90

[56] References Cited

U.S. PATENT DOCUMENTS

| Re. 25,281 | 11/1962 | Moore . |
|---|---|---|
| Re. 28,831 | 5/1976 | Brown . |
| 2,663,810 | 12/1953 | Stein . |
| 3,112,419 | 11/1963 | Dobslaw . |
| 3,226,585 | 12/1965 | Roe . |
| 3,412,270 | 11/1968 | Wacek . |
| 3,484,860 | 12/1969 | Csaki . |
| 3,648,938 | 3/1972 | Dryburgh . |
| 3,768,152 | 10/1973 | Swanke et al. . |
| 4,053,800 | 10/1977 | Hanning et al. . |
| 4,074,418 | 2/1978 | Pearsall . |
| 4,123,678 | 10/1978 | Jacoby . |
| 4,217,514 | 8/1980 | Simazaki et al. . |
| 4,311,935 | 1/1982 | Hoyss . |
| 4,322,647 | 3/1982 | Neroda et al. . |
| 4,340,829 | 7/1982 | McCoy . |
| 4,342,929 | 8/1982 | Horne . |
| 4,469,967 | 9/1984 | Grierson et al. . |
| 4,471,246 | 9/1984 | Paillet . |
| 4,498,230 | 2/1985 | Harris et al. . |
| 4,550,268 | 10/1985 | Becker et al. . |
| 4,578,852 | 4/1986 | Sauerwein et al. . |
| 4,612,702 | 9/1986 | Wheeler . |
| 4,613,781 | 9/1986 | Sanders . |

FOREIGN PATENT DOCUMENTS

| 0200236 | 11/1986 | European Pat. Off. . |
|---|---|---|
| 3328403 | 2/1984 | Fed. Rep. of Germany . |
| 2068787 | 8/1981 | United Kingdom . |
| 2160369 | 12/1985 | United Kingdom . |

Primary Examiner—Carl E. Hall
Attorney, Agent, or Firm—Dennis A. Dearing; John D. Del Ponti; Charles E. Yocum

[57] ABSTRACT

A unitary end bell 66 includes a body 90 and a bridging section 92 and is assembled with a lamination stack 74 in the formation of a stator subassembly 150. End bell 66 is formed with base surfaces 118 at one end thereof which insulate adjacent portions of lamination stack 74 from coil windings 152 and is further formed with wire-retaining shrouds 110 which retain coil windings 152 in a wound configuration. Bridging section 92, which straddles the other end of body 90, is formed with brush channels 120 for supporting brush boxes and a bearing nest 138 for supporting an armature bearing.

9 Claims, 6 Drawing Sheets

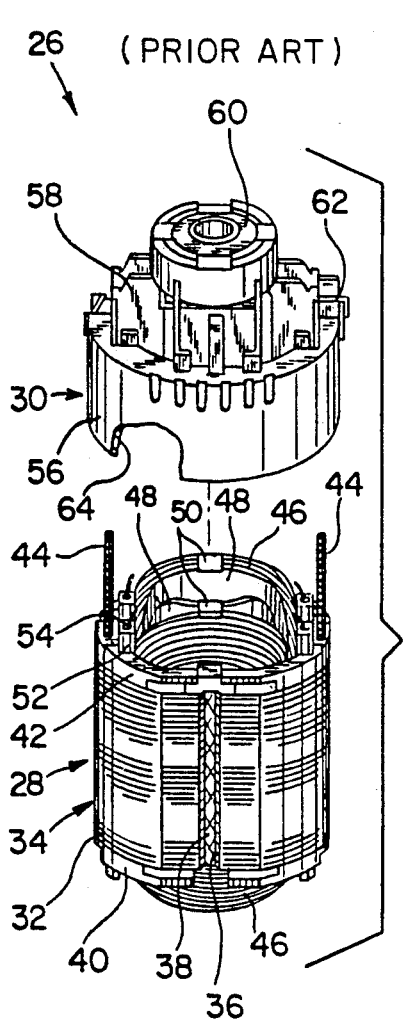
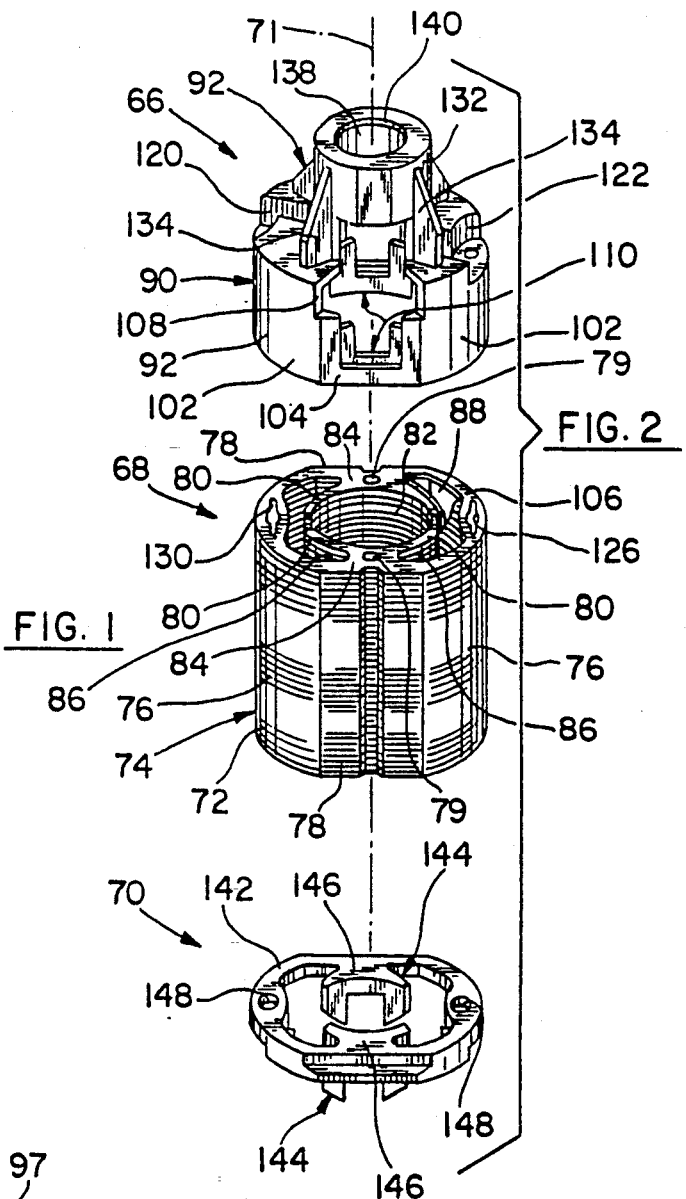
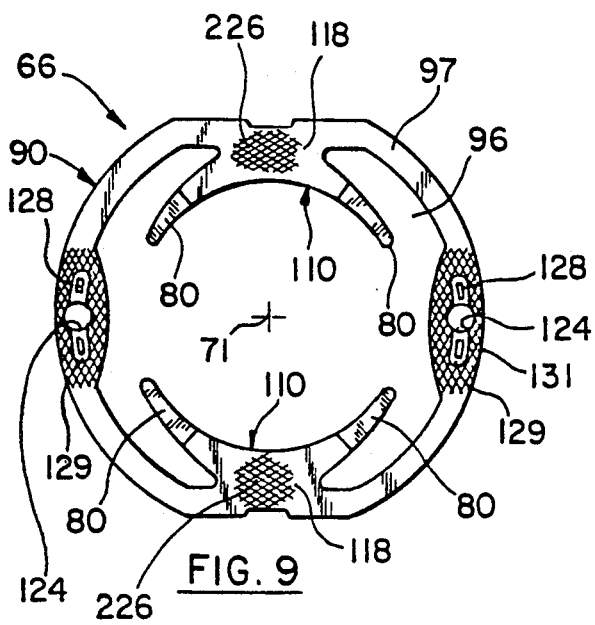
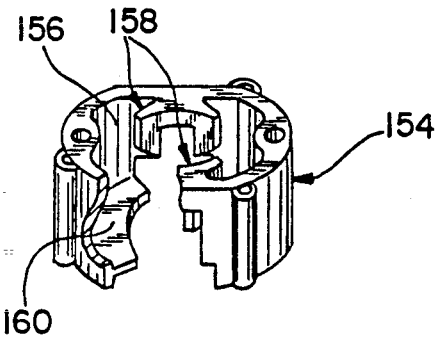
FIG. 1 (PRIOR ART)
FIG. 2
FIG. 3
FIG. 9

METHOD FOR ASSEMBLING A STATOR SUBASSEMBLY

This is a division of application Ser. No. 07/443,671 filed Nov. 28, 1989, now Pat. No. 5,099,164. Ser. No. 07/443,671 is a division of Ser. No. 07/077,263 filed Jul. 24, 1987, now Pat. No. 4,885,496.

FIELD OF THE INVENTION

This invention relates to a stator end member and assemblies which include the end member and further relates to methods of assembly thereof. In particular, this invention relates to the unitary structure of an end member, such as an end bell of a stator subassembly, to various motor-related assemblies which include the end member and to methods of assembling the end member with laminations of a field core and to methods of assembling a field coil with the assembled end bell and field core.

BACKGROUND OF THE INVENTION

One type of an electric motor, such as a universal or series motor, includes a stator subassembly having a stack of metal laminations arranged to form a hollow, magnetic core with pole pieces. Insulating end rings are located at each end of the stack of laminations and include portions which cover the pole pieces of the end-most laminations. A magnetic wire is wound about the pole pieces to form field coils with insulating slot liners being located to preclude electrical contact between the wire and metal laminations including the pole pieces. An end bell is positioned over one end of the stack including the end ring and typically has skirt portions which extend over the outer peripheral surfaces of several laminations at the one end of the stack. The end bell is secured to the stack and is formed typically with a bridging section which supports a shaft bearing and brush boxes. Other end elements may be assembled at the opposite end of the stack in similar fashion.

The stator subassembly is then available for assembly with other components to thereby form a motor pack which can be assembled with an appliance, tool or device to be operated by the motor.

SUMMARY OF THE INVENTION

This invention contemplates an end member for assembly with a lamination stack in forming a stator subassembly and includes a body having a bridging means formed integrally therewith for supporting motor-related elements. The end member is further formed integrally with means for insulating field wiring from the lamination stack.

Further, this invention contemplates a stator subassembly including a lamination stack in assembly with an end member which are held together by a coil winding wound about adjoining portions of the stack and the end member. The end member also includes a bridging means which is formed integrally with the adjoining portion of the end member and which provides support for motor-related elements.

Also, this invention contemplates a method of forming a stator subassembly by assembling an end member with a lamination stack and thereafter winding a field coil wire around adjoining portions of the end member and stack.

Other features and advantages of the present invention will become more fully apparent from the following detailed description of the preferred embodiment, the appended claims and the accompanying drawings.

BRIEF DESCRIPTION OF THE DRAWINGS

FIG. 1 is a perspective view showing a prior art stator subassembly with an end bell thereof positioned, in an assembly alignment, above a lamination stack having end rings and field coils;

FIG. 2 is a perspective view showing an end bell in accordance with certain principles of the invention being in position for assembly with a lamination stack and end ring in accordance with certain principles of the invention;

FIG. 3 is a perspective view showing an end spacer in accordance with certain principles of the invention which may be substituted for the end ring of FIG. 2;

FIG. 9 is a plan view showing the outline of the face of the end bell of FIG. 2 which is interfaced with the end-most lamination of the stack and further shows shaded end portions of pole pieces of the stack which extend beyond a shroud base of the end bell in accordance with certain principles of the invention;

FIG. 10 is a side view showing an alternate embodiment of the end bell of FIG. 2 in accordance with certain principles of the invention;

Figure 5:
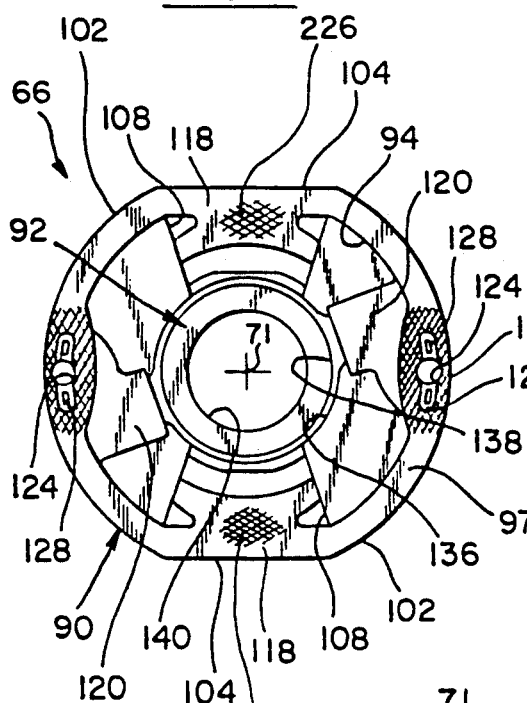
FIG. 5 is a bottom view showing the end bell of FIG. 2.
Figure 4:
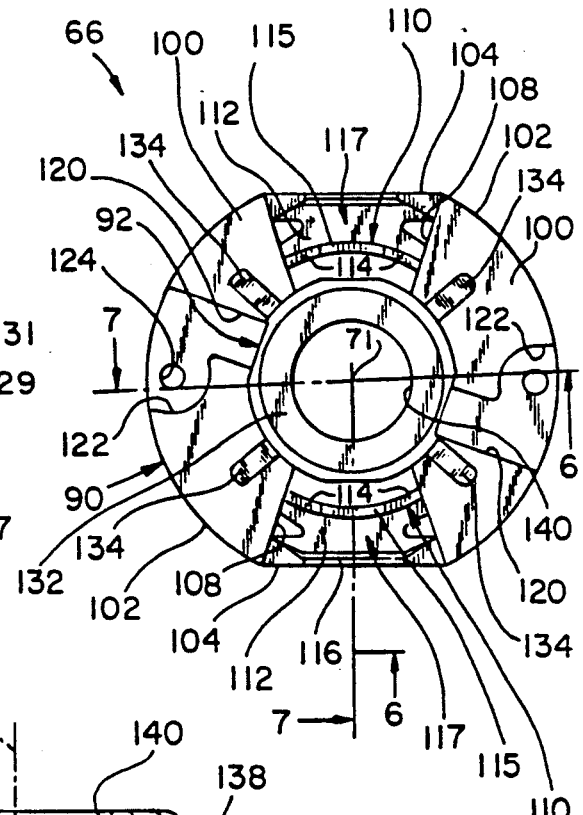
FIG. 4 is a plan view showing the end bell of FIG. 2.

DETAILED DESCRIPTION OF THE PREFERRED EMBODIMENT;

The preferred embodiment of the present invention is illustrated by way of example in FIGS. 2 and 4 through 7. Referring to FIG. 1, a prior art stator subassembly 26, which ultimately forms a component of a universal or series motor (not shown), includes a field 28 and a plastic end bell 30 which are assembled to form the stator subassembly. It is noted that end bell 30 is assembled at what is commonly known as the commutator end of stator subassembly 26. The field 28 includes a plurality of laminations 32 arranged in a lamination stack 34 to form an iron or ferromagnetic core having a cylindrical-like bore. The lamination stack 34 is formed with a pair of grooves 36 (one shown) on opposite sides of the stack to provide for a weld bead 38 to retain the laminations 32 in the stacked arrangement. A pair of plastic end rings 40 and 42 are secured to opposite ends of the lamination stack 34 by threaded members 44 which extend through the stack.

Laminations 32 are each formed with two sets of pole piece members (not shown) which, when arranged to form stack 34 form two sets of pole pieces (not shown) internally of the bore of the core. The end rings 40 and 42 are formed with corresponding structure which overlap the pole pieces at opposite ends of the stack 34. Slot liners (not shown), composed of an insulating material, are placed in areas adjacent the pole pieces. Two sets of wire coils 46 are wound about the pole pieces of stack 34 and the overlay structure of the end rings 40 and 42 with the slot liners insulating the wire of the coils from engagement with the metallic pole pieces and adjacent walls of the stack. Each of the end rings 40 and 42 is formed with a coil retainer 48 and an overlay tab 50 and are also formed with terminal support posts 52 which support sleeve-type terminals 54 to facilitate the electrical securement of the wire ends of coils 46.

End bell 30 is formed with a cylindrical portion 56 and a bridge section 58 which is configured to provide nests and channels to support an armature shaft bearing 60 and brush boxes 62. The size and shape of the opening of cylindrical portion 56 is formed so that the end bell 30 fits over the uppermost laminations 32 of stack 34 whereby the cylindrical portion forms a skirt 64. As end bell 30 is assembled with field 28, threaded members 44 are further utilized to secure the end bell with the field.

Prior art stator subassembly 26 requires initial assembly of the lamination stack 34 with facility, such as weld bead 38, for retaining laminations 32 in the stacked arrangement. Separate end rings 40 and 42 must then be assembled and secured to opposite ends of stack 34 to provide facility for retaining coils 46 with the stack.

Coils 46 are wound onto the stack 34 and assembled end rings 40 and 42 prior to any further assembly of elements to form stator subassembly 26. Thus, end rings 40 and 42 must be provided with facility such as terminal posts 52 for terminating the wiring of the coils to insure that such wiring is readily available for subsequent connection to other components of stator subassembly 26.

Further, because of the manner in which coils 46 are arranged within stack 34, end rings 40 and 42 are formed with coil retainers 48 and overlay tabs 50 to prevent the wiring of the coils from moving laterally into the bore of the core.

Subsequently, end bell 30 is positioned over the end of field subassembly 28 with skirt 64 overlaying the adjacent periphery of stack 34.

Referring to FIG. 2, an end member such as an end bell 66, a field core 68 and another end member such as an end ring 70 are aligned along a common stator axis 71 for assembly in the preparation of the manufacture of a stator subassembly. End bell 66 is positioned for assembly at the commutator end of the stator subassembly while end ring 70 is positioned for assembly at the fan end thereof. End bell 66, which is further shown in other figures including FIGS. 4, 5, 6 and 7 illustrates the preferred embodiment of the invention with respect to end bell structure.

As shown in FIG. 2, field core 68 is formed by arranging a plurality of ferromagnetic laminations 72 in a stack 74 with a defined exterior having a pair of spaced cylindrical-like surfaces 76 and interspersed flat surfaces 78. It is noted that each lamination is formed with a pair of spaced bosses 79 which are more clearly shown in FIG. 15 and which form dimples on the other side of the lamination. As the laminations 72 are stacked, the bosses 79 seat in the dimples of the adjacent lamination whereby the laminations are interlocked and precluded from skewing. In this manner, the various elements of the laminations 72 are maintained in alignment.

Two opposed sets of pole pieces 80 are formed by the stack 74 and define a central bore 82 for subsequent receipt of an armature (not shown) in the formation of a motor. Pole pieces 80 are linked to the ring-like portion of lamination 72 by an integral neck 84 and are located to provide slots 86 for subsequent receipt of magnet wire to be wound as a field coil. A pair of slot liners 88 are located within slots 86 of stack 74 to insulate electrically the magnet wire from the metal walls of the slots. Note that, with the interlocking of laminations 72 by bosses 79, a weld bead is not required to retain the laminations in the stacked arrangement during formation of stator subassembly. Also, screws are not required for the same reason. However, either or both the weld bead or screws could be used without departing from the spirit and scope of the invention.

Referring to FIGS. 2 and 4 through 7, end bell 66 is a unitary structure composed of a suitable plastic material, such as a high-temperature engineering plastic material, and includes a body 90 and a bridging section 92 formed integrally therewith. Body 90 is generally cylindrical with a hollow chamber 94 having an opening 96 at a stack-engaging surface 97 (FIG. 5) at one end of the body. A wall 98 partially covers the opposite end of chamber 94 and forms a portion of bridging section 92. A shelf 100 is formed by the exterior surface of wall 98. Exterior side surfaces of body 90 are formed by two spaced cylindrical-like walls 102 and two interspersed flat walls 104 which conform to the exterior of stack 74 in shape and radial dimension from axis 71. Stack-engaging surface 97 (FIG. 5) of end bell 66, which is in the plane of and surrounds opening 96, is essentially identical to the configuration of a flat surface 106 (FIG. 2) of the outermost lamination 72 of stack 74 except for the tip ends of pole pieces 80 as viewed in FIG. 9.

A pair of windows 108 are formed in opposite spaced portions of wall 98 and flat side walls 104 to reveal a pair of spaced, wire-retaining shrouds 110 within chamber 94. Each of the shrouds 110 is integrally formed with and spaced from adjacent flat wall 104 by neck portion 112 located at opening 96 of chamber 94. Each of the shrouds 110 is formed by a pair of spaced retainer members 114 which are joined by a linking web 115 near the base thereof. As viewed particularly in FIG. 7, an inwardly-facing wall surface 116 is formed by flat wall 104 and is contiguous with neck portion 112 and spaced from web 115 all of which combine to form a nest 117 which receives the initial strands of magnet wire in forming a coil winding. The opposite extreme sides of the spaced members 114 extend a distance which is equal to the width of the portion of window 108 formed in flat wall 104. Further, shrouds 110 are formed in a curvature from side to side radially about axis 71.

While the extended configuration of pole pieces 80 is required in the magnetic circuit of a stator subassembly, it has been determined that it is not necessary to insulate the entire flat surface of the pole pieces in the assembly of the stator subassembly components. As illustrated in FIG. 9, base surfaces 118 of each of the shrouds 110, which form portions of stack-engaging surface 97, cover and effectively insulate the underlying portions of pole pieces 80 and associated necks 84 (FIG. 2) but do not cover the extreme ends of the pole pieces. As will be discussed hereinbelow, end bell 66 with base surfaces 118 and the integral plastic material extending from the base surface to portions of shroud 110 and neck portions 112 provide the necessary insulation over the underlying portions the pole pieces 80 and necks 84 in accordance with certain principles of the invention.

Referring further to FIGS. 2 and 4 through 7, a pair of spaced, aligned brush channels 120 are formed in wall 98 of bridging section 92 of end bell 66 to support a pair of brush boxes (not shown) in the ultimate assembly of brushes (not shown) to form the motor. Clearance wells 122 are formed commonly with brush channels 120 and surround apertures 124 which extend through body 90 of end bell 66 as more clearly viewed in FIG. 6. Apertures 124 are alignable with apertures 126 in lamination stack 74 to facilitate passageways for screws. As shown in FIG. 5, the stack-engaging surface 97 of end bell 66 is formed with spaced aligning pilots 128 and with embossments 129 which surround the pilots and which extend from apertures 124. Eventually the pilots 128, which extend outwardly from embossments 129, will locate in coarse fashion into slots 130 (FIG. 2) of similar configuration formed in each lamination 72 in communication with apertures 126 to assist in generally locating the end bell 66 with the stack 74. The area 131 of surface 97 immediately surrounding embossments 129 is scored in a grid-like pattern and also extends outwardly from surface 97 to a lesser extent than the embossments. The purpose of areas 131 will be explained hereinafter.

Bridging section 92 further includes a hub 132 which extends from wall 98 away from chamber 94. Hub 132 is supported by four ribs 134 which extend from exterior side walls of the hub to shelf 100. Hub 132 is formed internally with an open chamber 136, including a bearing nest 138. Hub chamber 136 communicates with chamber 94 of body 90 at one end thereof and is formed with an opening 140 at the bearing-nest end thereof.

Referring again to FIG. 2, end ring 70 is a flat plastic ring having a stack-engaging surface 142 which is configured identically to stack-engaging surface 97 of end bell 66. End ring 70 is formed with a pair of wire-retaining shrouds 144 and neck portions 146 which are identical to the structure of shrouds 110 and neck portions 112 of end bell 66. A pair of apertures 148 are formed through spaced locations of end ring 70 and are alignable with apertures 124 and 126 of end bell 66 and stack 74, respectively, for the reception of screws.

Figure 8:
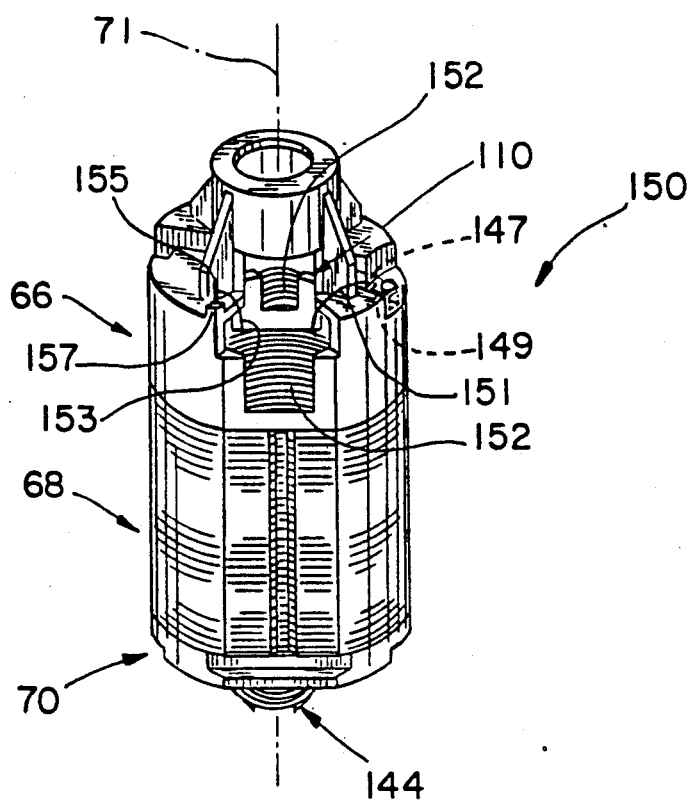
FIG. 8 is a perspective view showing the elements of FIG. 2 in assembly with a field coil wound around portions of the elements to hold the elements in the assembled configuration in accordance with certain principles of the invention.

A stator subassembly 150, as shown in FIG. 8, includes end bell 66, field core 68 and end ring 70 and further includes two sets of field coil windings 152 which have been wound about shrouds 110 and 144 at opposite ends of stack 74 and through the associated slots 86 of the stack. It is noted that coil windings 152 are contained totally within stator subassembly 150. Initially, in an assembly operation to form stator subassembly 150, a bearing (not shown) is press fit into nest 138. Brush boxes (not shown) are assembled within brush channels 120. End bell 66 and end ring 70 are assembled to opposite ends of lamination stack 74 to form an unwound subassembly with the stack engaging surfaces 97 and 142, respectively, engaging and covering the flat surfaces of the outermost laminations 72 in the manner illustrated in FIG. 9. In this assembly, end bell 66, field core 68 and end ring 70 are maintained in alignment with axis 71. Further, the stack-engaging surface portions of the end bell 66 and end ring 70 which engage and cover portions of pole pieces 80 and necks 84, in the manner illustrated in FIG. 9, provide a means formed integrally with the unitary end bell for insulating the covered areas.

Thereafter, a wire-winding facility (not shown) is moved into the end-ring or fan end of a bore formed by the unwound subassembly and is positioned to effect a wire winding operation. A wire-winding technique which can be used to effect the winding of wire within the bore of the unwound subassembly is disclosed in U.S. Pat. No. 4,612,702 which issued in the name of the applicant herein, Dale K. Wheeler, and which is assigned to the same assignee, Black & Decker Inc. The technique disclosed in U.S. Pat. No. 4,612,702 uses an eccentric winding method for laying the magnet wires into the slots 86 of the lamination stack 74, into the nests 117 and across the neck portions 112 of end bell 66 and the neck portions of end ring 70. As noted above with respect to the unitary end bell 66, the plastic material of the end bell between each of the base surfaces 118 on the one side, and the neck portions 112 and portions of the shrouds 110 on the other side, insulate the pole pieces 80 and necks 84 from the magnet wire. Thus, the unitary end bell 66 not only includes the insulating means as noted above but also includes bridging section 92 which provides support facility for such motor-related elements as brushes and a shaft bearing. Also, end ring 70 provides a comparable insulating effect at the opposite end of lamination stack 74.

Thus, unitary end bell 66 provides all of the features necessary at the one end of field core 68 in the formation of stator subassembly 150 and, therefore, eliminates the need for an additional end ring such as that required in stator subassembly 26 (FIG. 1). This is attainable even though the outer end of end bell 66 is effectively closed by the structure of bridging section 92. As shown in FIG. 8, by use of unitary end bell 66, stator subassembly 150 has an essentially consistent exterior in shape and dimension from one end to the other because the exterior of the end bell is uniformly flush with the exterior of the lamination stack. This provides a stator subassembly which requires less space in a motor housing and thereby permits a slimmer appliance in comparison to an appliance which uses the prior art stator subassembly 26 illustrated in FIG. 1. Further, since no additional elements need to be assembled with stator subassembly 150, such as the post-winding assembly of end bell 30 required in stator subassembly 26 (FIG. 1), field coil windings 152 of stator subassembly 150 provide a means for holding all of the elements (i.e. end bell 66, field core 68 and end ring 70) together subsequent to the winding operation. This eliminates the need for a separate facility, such as a weld bead and/or screws, to retain the elements in assembly.

Further, since the windings 152 are being wound directly in the final assembly of stator subassembly 150, the ends of the windings can be terminated in a final manner. For example, the terminating ends can be connected directly to associated brush boxes mounted in end bell 66 instead of being connected to terminals 54 (FIG. 1) for subsequent connection to other facilities as is done with respect to prior art stator subassembly 26. Also, other terminating ends of the windings 152 can be connected directly to termination points mounted or formed on end bell 66 for subsequent connection to circuits external of stator subassembly 150. For example, referring to FIG. 8, a brush box 147 is illustrated in phantom and is formed with a terminal 149 for connection to one end 151 of coil winding 152 while the other end 153 of the coil winding is connected to a terminal 155 mounted in post 157 formed integrally with end bell 66.

Also, the structure of end bell 66 facilitates the formation of coil windings 152 during the winding operation totally from within the bore opening of the stator subassembly 150 which includes the end bell. Therefore, coil winding 152 is contained totally within stator subassembly 150.

Referring now to FIG. 3, another end member such as an end spacer 154 is formed with a generally cylindrical shell 156 and a pair of shrouds 158 which are identical to shrouds 110 and 144 of end bell 66 and end ring 70, respectively. Also, end spacer 154 is formed with spaced baffles 160 (one shown) on opposite inner walls of shell 156. End spacer 154 may be used in place of end ring 70 and assembled at the fan end of the stator subassembly for a motor assembly which includes a fan (not shown). In such use, the fan would be located outside one end of shell 156 and adjacent baffles 160 which assist in the air flow operation of the fan. Use of end spacer 154 discloses another embodiment of a stator subassembly which is accomplished without departing from the spirit and scope of the invention.

Figure 11:
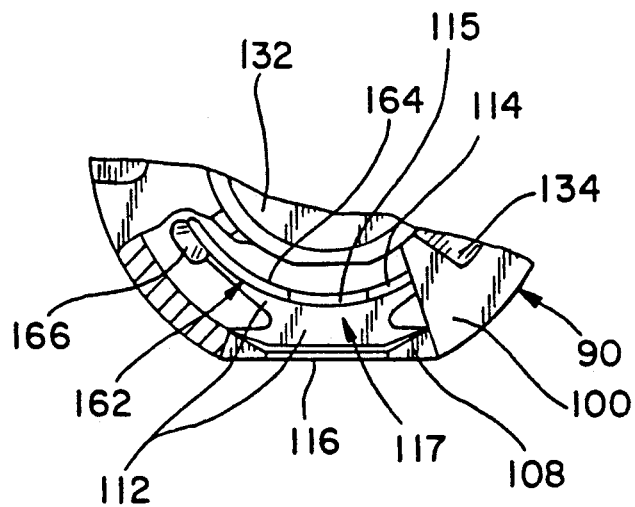
FIG. 11 is a plan view of a portion of the end bell showing the alternate embodiment of FIG. 10.

As shown in FIGS. 10 and 11, a shroud 162 illustrates an alternate embodiment that may be used in place of shroud 110 on end bell 66 when moderate gage wire is being used to manufacture medium size motors. Shroud 162 is formed with a retainer member 164 which extends to the left side, for example, of window 108 of end bell 66 for a distance which is sufficient to permit the base surface of the member and associated neck portion 112 to completely cover the underlying pole piece 80 and neck 84. The remaining portions of shroud 162 may include spaced retainer member 114 which is linked to member 164 by web 115 in the same manner as previously described. Or, member 114 may be replaced with a member corresponding in shape to member 164 which extends a comparable distance to the right of window 108. Further, shroud 162 could be solid from one side to the other instead of being formed with the space which normally appears above web 115.

The front face of member 164 immediately adjacent the left edge is formed integrally with a half cone-shaped cam element 166 which protrudes outwardly from the member. During a coil winding operation, the corner edge of slot liner 88 (FIG. 2) tends to protrude into the path of the magnet wire in an area at the lower left edge of the front face of retainer member 164. This protrusion frequently causes the magnet wire to be misdirected such that the wire falls behind slot liner 88 or causes the slot liner to buckle. Obviously, this is unacceptable.

As the magnet wire is fed across the front face of shroud 162 and downwardly toward nest 117 (FIG. 7), cone-shaped cam element 166 forces the wire away from the front face of the shroud and thereby away from slot liner 88. In this manner, the magnet wire is positioned to be fed into slot 86 in front of slot line 88 and avoids buckling of the slot liner or being fed behind the liner.

Figure 12:
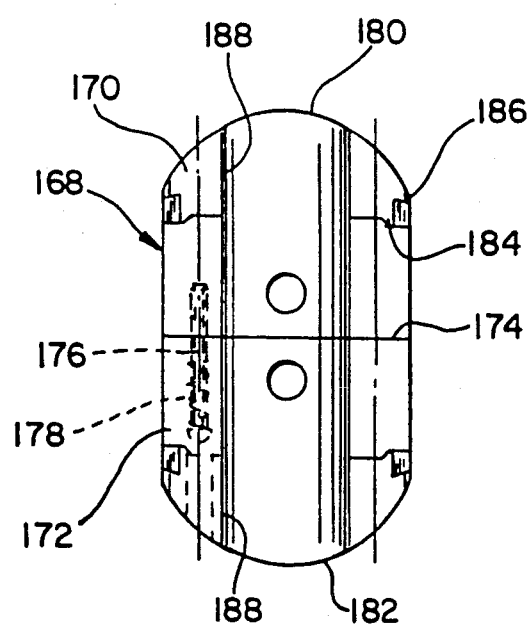
FIG. 12 is a front view showing a guide for bolstering a shroud of the end bell of FIG. 2 in accordance with certain principles of the invention during a field coil winding operation.

Referring to FIG. 12, a shroud support 168 is designed to be positioned behind shroud 110, for example, during a coil winding operation when heavy gage wire is being used to manufacture large motors. This bolsters shroud 110 against any undue stresses which may be exerted against the shroud during the winding of the heavy gage wire. Once the winding operation is complete, shroud 110 is of sufficient strength to retain the coil winding, such as winding 152, in the coiled configuration. Shroud support 168 is also used to support shroud 144 of end ring 70 in the same manner. Shroud support 168 also provides a wire camming facility in the manner of shroud 162 to guide or cam the magnet wire over and away from slot liner 88 for reasons described above.

Shroud support 168 is formed with two sections 170 and 172 which are essentially identical in exterior configuration and which are composed of a metal material such as, for example, hardened polished steel. Sections 170 and 172 are held in abutting engagement along face line 174 by a threaded member 176 and spring 178. The outer ends 180 and 182 of sections 170 and 172, respectively, are curved as shown with opposite corners of each section being formed with a support latch 184 and a cam element 186 having a sloping surface 187. As viewed in FIG. 13, the outwardly facing surface of each of the sections 170 and 172 of shroud support 168 is formed in a curvature which conforms to the curvature of shrouds 110 and 144. Also, each outwardly facing surface is formed with a longitudinal recess 188 which snugly receives and supports the inward surface of shroud 110, for example, as viewed in FIG. 13. As further viewed in FIG. 13, the inward surface of each of the sections 170 and 172 is formed in a concave curvature 190.

Figure 14:
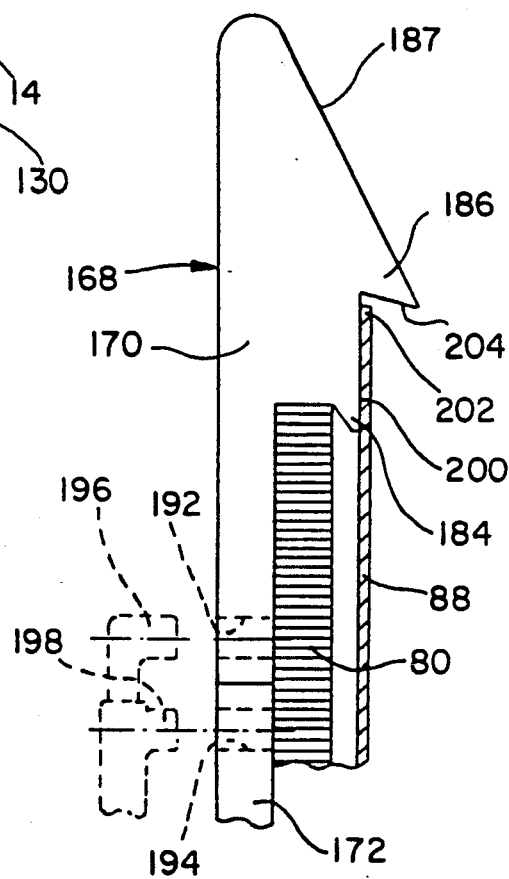
FIG. 14 is a view taken along line 14—14 of FIG. 13 showing the guide of FIG. 12 in position with a pole piece and a slot liner in preparation for the winding operation.

Referring to FIG. 14, in assembly of shroud support 168 with the unwound stator subassembly, a pair of apertures 192 and 194 of sections 170 and 172, respectively, are positioned over a pair of robot fingers 196 and 198, respectively. Thereafter fingers 196 and 198 are moved in an axial direction of bore 82 in unison to position shroud support 168 into the bore generally close to the axis 71 thereof but clearly inwardly of shrouds 110 and 144. When shroud support 168 is adjacent to a shroud support position, fingers 196 and 198 move away from each other against the action of spring 178 to separate sections 170 and 172 from each other. Fingers 196 and 198 then move laterally of axis 71 whereby a surface 200 of section 170 engages and moves slot liner 88 away from pole piece 80. Fingers 196 and 198 then are moved toward each other whereby sections 170 and 172 engage along face line 174. As this occurs, support latch 184 is located forward of pole piece 80 while holding slot liner 88 in the outwardly spaced position. An identical action is taking place with the remaining three latches 184 located at the remaining three corners of shroud support 168. By virtue of the four latches 184, shroud support 168 is latched to pole pieces 80 within the bore of the unwound subassembly which includes end bell 66, field core 68 and end ring 70. Also, support 168 moves recesses 188 into place to support shrouds 110 and 144.

As shroud support 168 is moved into the latched position, each of the cam elements 186 moves over an adjacent end 202 of the slot liner 88 to capture the end under a downwardly slanting roof 204 formed by the cam elements. In this manner, the ends 202 of slot liners 88 are precluded from extending forward of cam elements 186 by the slanting roofs 204. Thereafter, fingers 196 and 198 are moved laterally inwardly toward axis 71 whereby the fingers move out of apertures 192 and 194 and disengage the latched shroud supports 168. Fingers 196 and 198 are then retracted from bore 82 in an axial direction.

Figure 13:
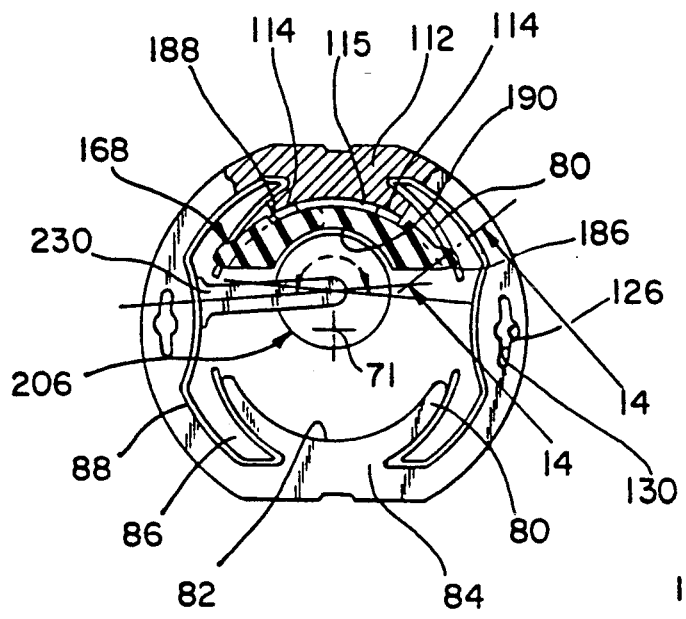
FIG. 13 is a plan view, partially in section, showing the relative position of the guide of FIG. 12 and portions of the slot liners adjacent each end of the pole pieces.

An eccentric winding mechanism 206, shown in FIG. 13, is then moved axially into bore 82 and then outwardly laterally of axis 71 to the position illustrated within the curvature 190 of shroud support 168. Mechanism 206 is then operated in the manner described in the aforementioned U.S. Pat. No. 4,612,702 to effect a winding operation whereby a magnet wire is guided over the sloping surface 187 of each cam element 186 to prevent the wire from engaging end 202 of slot liners 88.

Thus, the multipurpose shroud support 168 is self-latching to the unwound subassembly, supports shrouds 110 and 144 during a winding operation without interfering with such operation, conceals the ends 202 of the slot liners 88 and guides the wire away from the liner ends. In addition, while shroud support 168 is of sufficient size to accomplish the above-noted actions, portions of the support which are located in chamber 94 of end bell 66 during this period do not engage any portion of the end bell notwithstanding the presence of bridging section 92.

Subsequent to the completion of the winding operation, the winding mechanism 206 and shroud support 168 are extracted from bore 82 in a procedure which is the reverse of the above-described procedure.

When manufacturing stator subassemblies, such as stator subassembly 150, stresses are exerted upon shrouds 110 by the magnet wire during the formation of coil winding 152. These stresses, which tend to deflect shrouds 110 inwardly toward axis 71, vary with the gage of the wire and by the different geometric patterns of the coil windings 152 which may be used. The smaller gage wire produces the least stress. If shrouds 110 are deflected considerably, they may interfere with the subsequent assembly of an armature subassembly within the bore of stator subassembly 150. This is particularly so at the fan end of stator subassembly 150 where the wide body of the armature must pass through to its final destination within the portion of the bore of the stator subassembly formed by the lamination stack 74. The commutator of the armature subassembly, being smaller in diameter, should have no difficulty fitting into chamber 94 of end bell 66 notwithstanding the deflection of shrouds 110.

In small motors, the gage of the magnet wire is small and the deflection of shrouds 110 is minimal. Hence, with small motors, end bell 66 with shrouds 110 can be used with no need for support during a winding operation by shroud support 168 or for use of shrouds 162. With medium size motors using moderate gage magnet wire, the shroud deflection becomes more of a concern. In this instance, the wider shroud 162 with the cam element 166 may be used to provide a sturdier support with limited deflection during the winding operation. Finally, for larger motors using larger gage wire, shroud support 168 may be used to provide firm backing for shrouds 110 during the winding operation.

In the formation of coils 48 of prior art stator subassembly 26 (FIG. 1), winding forms or horns must be used. While the horns are inserted axially into the bore of the stack 34, the horns are movable to a wire forming position and are held during a wire forming operation by a facility which enters the bore laterally through slots formed in the thickness plane of end rings 40 and 42. The slots are located adjacent to and communicate with the area outwardly of coil retainers 48 whereby portions of the magnet wire of the coils 46 are located over the slots. Major portions of the slots are situated such that the magnet wire of coils 46 are exposed to the end-most lamination 32. Therefore, in order to satisfy national and international creep-voltage safety standards, end rings 40 and 42 must be of a prescribed thickness to insure that the magnet wire is sufficiently spaced from the end-most lamination 32 to satisfy the safety standards.

As noted above, shroud support 168 is inserted axially into and manipulated totally within bore 82 and moved into the shroud supporting position where the shroud support is latched in place. The manipulating mechanism is then extracted to clear the bore for the insertion of winding mechanism 206. By controlling movement of the shroud support 168 from within bore 82, and by latching the support within the bore, there is no need for the formation of slots in end bell 66 to control shroud support 168 from a position outside of the end bell. Therefore, the effective thickness of the portion of end bell 66 which interfaces with lamination stack 74 is less than the thickness of end rings 40 and 42 of prior art stator subassembly 26. This comparatively reduces the mean length of turn of the magnet wire required in the formation of coil windings 152 thereby reducing the costs of the resultant product.

Figure 15:
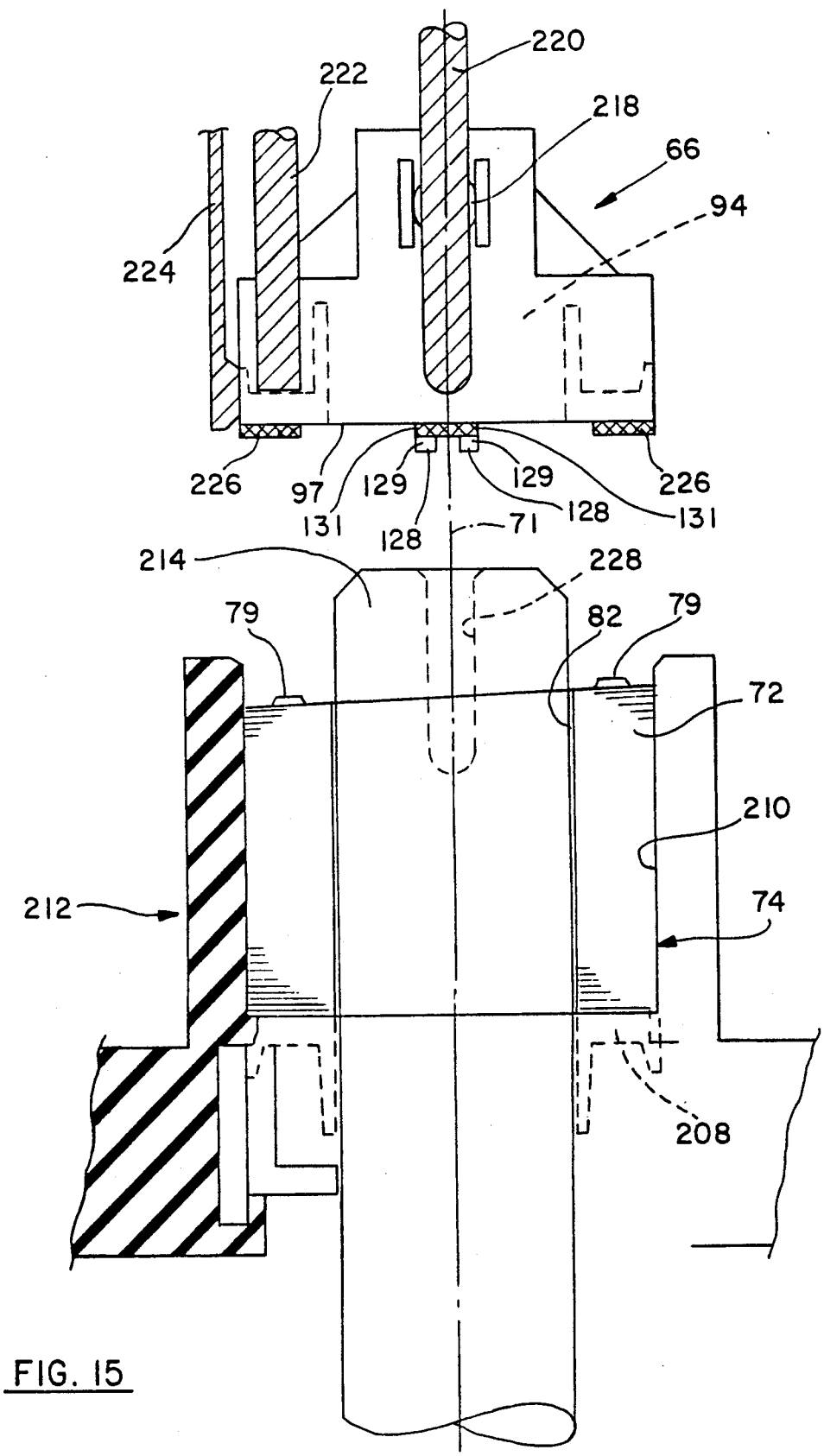
FIG. 15 is a side view, partially in section, showing the manner of assembling the end bell of FIG. 2 with the lamination stack.

Referring to FIG. 15, in the formation of a stator subassembly, such as stator subassembly 150 (FIG. 8), an end member such as a multifunctional end spacer 208 is mounted at the base of a loading nest 210 of an assembly pallet 212 which is aligned with axis 71. It is noted that other end members such as end ring 70 or end spacer 154 could be substituted for end spacer 208 in the formation of the stator subassembly. A plurality of laminations 72 are deposited into nest 210 and onto end spacer 208. As noted above, each of the laminations 72 is formed with the pair of coined bosses 79 which project upwardly from the plane of the lamination to interlock the laminations and prevent skewing thereof. Bosses 79 are located in the necks 84 of laminations 72 as illustrated in FIG. 2. After end spacer 208 and laminations 72 have been inserted into pallet nest 210, an expandable mandrel 214 is positioned axially within bore 82 of stack 74. The expandable elements (not shown) of mandrel 214 are then positioned to engage and align the bore portions of laminations 72.

Because of tolerances in the thickness dimension of laminations 72, the laminations may not stack in a parallel fashion, but may appear higher on one side than the other. This tilted or nonparallel condition is illustrated in FIG. 15 in an exaggerated manner but nonetheless depicts a condition which could occur. Thus, at least the uppermost lamination 72 is not perpendicular with stator axis 71.

Figure 6:
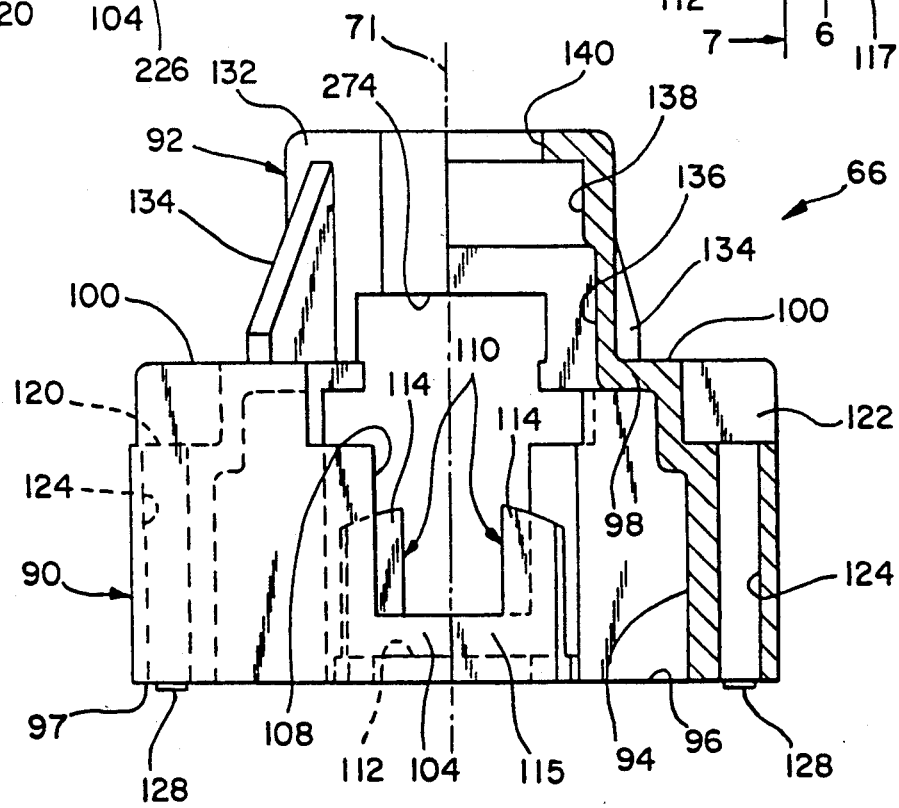
FIG. 6 is a sectional view taken along line 6—6 of FIG. 4 showing the end bell of FIG. 2.
Figure 7:
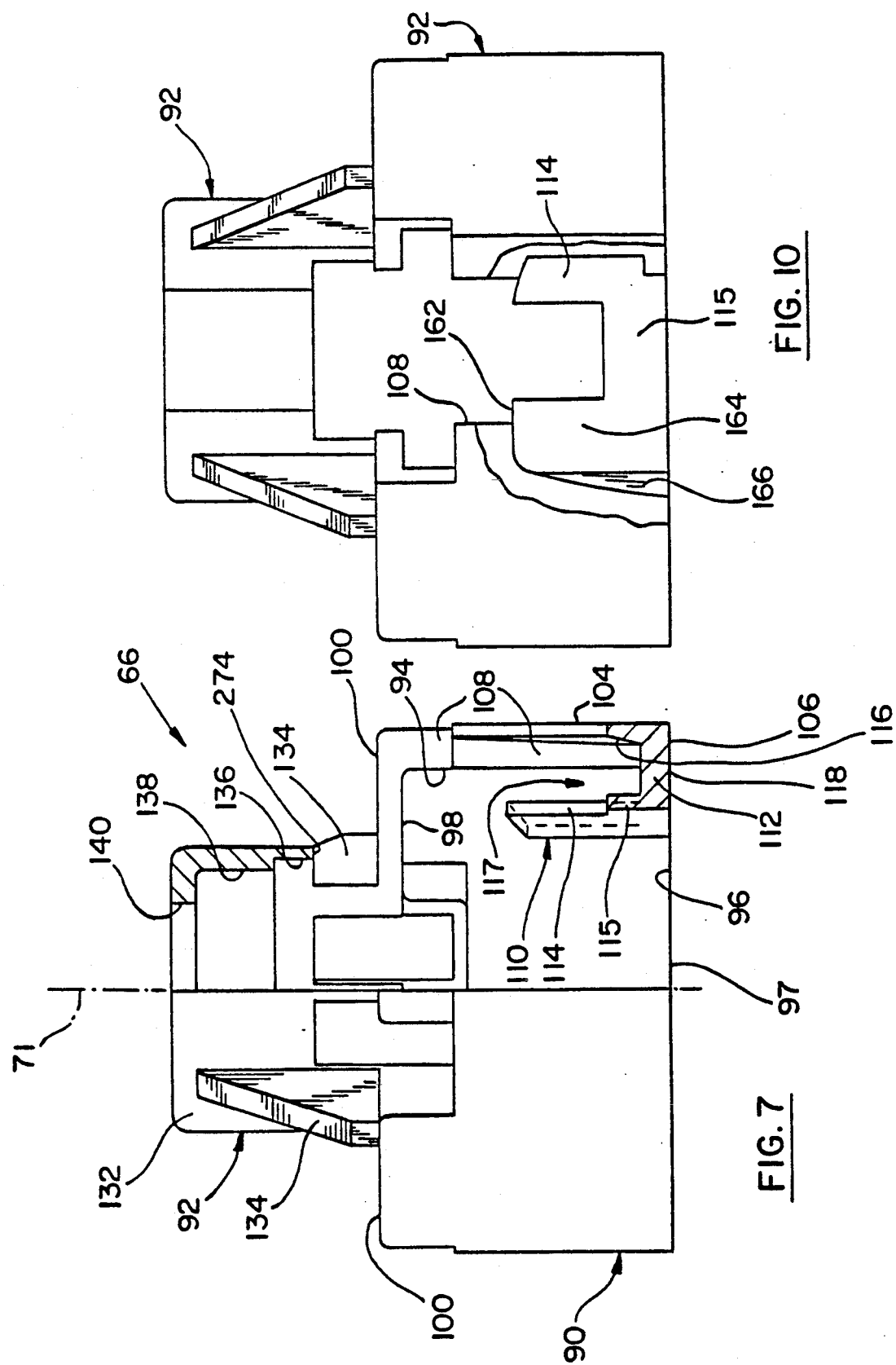
FIG. 7 is a sectional view taken along line 7—7 of FIG. 4 showing the end bell of FIG. 2.

As further illustrated in FIG. 15, end bell 66 supports a shaft bearing 218 in nest 138 (FIG. 6). A pilot pin 220 of a press (not shown) is located in bearing 218 and extends into chamber 94 of end bell 66 in alignment with stator axis 71. A plurality of wedge lock press pins 222 (one shown) and a plurality of skirt locator fingers 224 (one shown) are positioned at four spaced locations about end bell 66 as shown. With the arrangement of pilot pin 220, press pins 222 and locator fingers 224, end bell 66 is supported in precise axial alignment with stator axis 71 whereby stack-engaging surface 97 of the end bell is perpendicular to the stator axis.

In this embodiment of end bell 66, a plurality of embossments 226 have been formed in a grid-like pattern integrally with and project from the stack-engaging surface 97 of the plastic end bell. As noted above, surface 97 (FIG. 5) is formed with pads 128, embossments 129 and grid-patterned areas 131. Thus, grid-patterned areas 131 and grid-patterned embossments 226 are located at four spaced areas ninety degrees apart on surface 97 of end bell 66 as shown in FIG. 5.

Eventually, the press is operated to lower end bell 66 toward the stacked laminations 72. Initially, pilots 128, which are smaller in profile than slots 130, guidingly enter into slots 130 of the outermost laminations 72 to provide a coarse alignment of the end bell 66 with stack 74. Embossments 129 of end bell 66 are shaped similarly to, but of a larger profile than, slots 130. Thereafter, embossments 129 are swaged in and about the slots 130 to provide a more accurate piloting of the end bell 66 with the stack 74. As the press lowers end bell 66 further, the surface areas of the outermost lamination 72 which surrounds apertures 124 and slots 130 engage grid-patterned areas 131 whereby portions of areas 131 are deformed depending on the tilt or nonparallelism of stack 74. For example, those portions of areas 131 which engage the higher portions of the tilted stack 74 will be deformed more deeply than the portions of the areas which engage the lower portions of the stack while the end bell 66 is held in axial alignment with stator axis 71.

Further, during the lowering of end bell 66, the grid-patterned plastic embossments 226 engage and are disturbed and swaged by the metal bosses 79 of the outermost lamination 72. In this process, each of the bosses 79 functions much like a dowel and forms a "personalized" dowel hole (not shown), the depth of which is determined by the degree of tilt of the stack of laminations 72 at the location of the boss. While each boss 79 seats into an associated self-formed hole in the associated embossment 226, and thereby assists in precisely locating end bell 66 with respect to laminations 72, the depths of the holes differ due to the tilt or nonparallelism of the laminations in the same manner described above with respect to areas 131. In any event, a precise four-point dowelling effect in grid-patterned areas 131 and embossments 226 with no slop is accomplished whereby end bell 66 is located in its true axial alignment with stator axis 71. Thus, by virtue of the manner in which end bell 66 is held by the press and by virtue of the swaging effect of areas 131 and embossments 226, any residual nonparallelism is negated.

Therefore, while the stack of laminations 72 remain in a nonparallel arrangement after assembly with end bell 66, the end bell which contains armature shaft bearing 218 remains in axial alignment with stator axis 71. Thus, any stator subassembly assembled by this technique will provide true axial alignment for the armature and armature shaft even though the laminations 72 of stack 74 are not parallel. This technique provides for superior armature alignment, reduces stack rubs which result in vibration and motor burnout and improves bearing life.

As the press lowers end bell 66 into assembly with lamination stack 74, pilot pin 220 enters into an opening 228 of mandrel 214 which supports a guide bushing (not shown) to facilitate guiding alignment of the pilot pin and the mandrel along stator axis 71.

Thereafter, pins 220 and 222 and fingers 224 are withdrawn from end bell 66 and mandrel 214 is withdrawn from bore 82 whereby the assembled spacer 208, laminations 72 and end bell 66 tend to relax from the compressed arrangement effected while under the influence of the press. The assembled end bell 66, stack 74 and end spacer 208 are then transported with pallet 212 to another station where a shroud supporting and coil winding operation is effected in the manner previously described with respect to FIGS. 12, 13 and 14.

In particular, pallet 212 is moved to another station whereat the relaxed end bell 66, laminations 72 and end spacer 208 which form an unwound assembly are again compressed. At this time, the deformed portions of surface 97 of end bell 66 and the mating portions of the endmost lamination 72 re-engage to insure the alignment of the end bell and lamination stack 74 attained during the four-point dowelling process when the deformations were being formed.

If shroud support 168 is needed, the support is moved through the fan end of unwound assembly and positioned to bolster shrouds 110 as described above. Eccentric winding mechanism 206 is then moved axially through the fan end of the unwound assembly rather than through the commutator end as with prior art stator subassembly 26 (FIG. 1). A pair of wire-feed needles 230 (one shown in FIG. 13) of mechanism 206 are positioned thereby into chamber 94 of end bell 66 adjacent to windows 108 thereof. It is noted that, in the winding of coils 48 of prior art stator subassembly 26 (FIG. 1), the winding mechanism enters the unwound assembly through the commutator end.

Each of the needles 230 is then moved to face the respective window 108 whereafter a robotic finger (not shown) enters the window and grips the leading end of the magnet wire at the mouth of the needle. The robotic finger retracts through the window 108 and attaches the leading end of the wire directly to brush box terminal 149 (FIG. 8) or to terminal 155 mounted in end bell post 157 (FIG. 8). In the alternative, the leading end of the magnet wire may be attached to a clip (not shown) mounted on pallet 212 for subsequent attachment to terminals 149 or 155. The winding operation is then effected and needle 230 is again positioned whereby a robotic finger (not shown) enters window 108, grips the trailing end of the wire and retracts through the window. The gripped end of the wire may then be attached to terminals 149 or 155 or, in the alternative, attached to a clip (not shown) on pallet 212 for subsequent connection to terminals 149 or 155.

As noted above, as the magnet wire is wound about the assembled end bell 66, lamination stack 74 and end spacer 208, the formed coil winding 152 is tightly wound in the formation thereof and also serves to hold the end bell, laminations 72 and end spacer in the compressed alignment. Thus the assembled stator subassembly 150 is then transported to another station for further processing.

In summary, unitary end bell 66 is a novel integrally molded unit which facilitates in a variety of ways the efficient and less costly assembly of a stator subassembly in the manufacture of precision universal or series motors and provides a more efficient and easier-to-handle product for the user. For example, unitary end bell 66 provides an end structure having a periphery which is coincident with the periphery of the lamination stack 74. This reduces the amount of material required for providing a stator subassembly end structure in comparison to the combination of end ring 42 and end bell 30 of prior art stator subassembly 26. Stator subassembly 150, which utilizes end bell 66, is slimmer in comparison to prior art stator subassembly 26 and thereby requires less space internally of a motor assembly. This provides for a variety of slimmer tools and appliances having slimmer and lighter shell housings which results in additional cost savings as well as user-handling advantages. Further, the unique design of end bell 66 provides for the sole end structure of the commutator end of stator subassembly 150 whereby wire connections from coil windings can be made directly to various locations on and about the end bell. This includes connections directly to brush boxes and external terminations. The direct-connection capability eliminates intermediate connections which are necessary when two-element end structures are used such as with prior art stator subassembly 26.

In prior art stator subassembly 26 (FIG. 1), because of the necessary internal structure of end bell 30 as well as the location of terminal posts 52, the end bell interfaces with the ring-like flat surfaces of end ring 42 for much less than 360 degrees around the ring-like structure of the end ring. Also, only two screws 44 are used to hold and compress end bell 30 and end ring 42 together. This results in an assembled stator subassembly 26 with limited rigidity and stability particularly at the commutator end.

In stator subassembly 150 (FIG. 8), end bell 66 interfaces with the endmost lamination 72 of stack 74 for the entire 360 degrees of the ring-like flat surface of the lamination. Also, coil windings 152 in combination with a pair of screws which would be located through apertures 124, 126 and 148 of end bell 66, lamination stack 74 and end ring 70, respectively, provide a four-point compression arrangement to compress the entire 360 degrees of surface 97 in interfacing relation to the flat face of the endmost lamination 72. In this manner, stator subassembly 150 is provided with maximum rigidity and stability which are essential elements in motor operation.

The above-described embodiments, of course, are not to be construed as limiting the breadth of the present invention. Modifications, and other alternative constructions, will be apparent which are within the spirit and scope of the invention as defined in the appended claims.

What is claimed is:

1. A method of assembling a stator subassembly, which comprises the steps of:
  (a) forming a stator end member having a first end and a second end and having a bridging section across the first end thereof;
  (b) assembling a bearing with the bridging section;
  (c) subsequent to steps (a) and (b), assembling the stator end member and a stator field core with the second end of the stator end member in an interfacing position with an end of the stator field core, and
  (d) subsequent to step (c), winding a wire about at least portions of the stator end member and the stator field core to form a coil winding and to hold the stator end member and the field core in the interfacing position.

2. The method as set forth in claim 1, which further comprises the step of:
  forming a wire-retaining shroud on the stator end member to support the coil winding.

3. The method as set forth in claim 2, which further comprises the step of:
  locating a shroud support to support the shroud during a period when the wire is being wound.

4. The method as set forth in claim 3, which further comprises the step of:
  attaching the shroud support to structure forming the stator subassembly independently of external support.

5. The method as set forth in claim 1, which further comprises the steps of:
  assembling an insulating liner between the field core and adjacent portions of the coil winding; and
  directing portions of the wire away from edge portions of the insulating liner during winding of the wire to form the coil winding.

6. A method of assembling a shroud support adjacent a wire-retaining shroud of an end member assembled at one end of a field core of a stator subassembly during a period when wire is being wound into engagement with the shroud and the field core, which comprises the steps of:
  moving the shroud support into a bore formed by the field core to a shroud-supporting position adjacent the shroud; and
  latching the shroud support to structure formed by the stator subassembly.

7. The method of assembling the shroud support as set forth in claim 6, wherein the step of moving the shroud support includes the steps of:
  moving the shroud support axially within the bore from the end of the field core opposite the end at which the end member is assembled into a position aligned with and spaced from the shroud; and
  moving the shroud support laterally of the axis of the bore to the shroud-supporting position adjacent the shroud.

8. The method of assembling the shroud support as set forth in claim 6, wherein the stator subassembly further includes an insulating liner having at least an edge portion located adjacent the end member, and which further comprises the step of positioning a portion of the shroud support over the edge portion of the insulating liner to direct the wire away from the edge portion.

9. The method of assembling the shroud support as set forth in claim 6, wherein the shroud support is formed by two sections which are biased together and are separable, and which further comprises the steps of:
  separating the two sections prior to moving the shroud support adjacent to the shroud to position latch elements of each section adjacent the stator subassembly structure; and
  thereafter urging the two sections together to position the latch elements of the sections into latching engagement with the structure.

* * * * *